US010956839B2

(12) United States Patent
Palani (10) Patent No.: US 10,956,839 B2
(45) Date of Patent: Mar. 23, 2021

(54) SERVER TOOL

(71) Applicant: Bank of America Corporation, Charlotte, NC (US)

(72) Inventor: Karthik Rajan Venkataraman Palani, Chennai (IN)

(73) Assignee: Bank of America Corporation, Charlotte, NC (US)

(*) Notice: Subject to any disclaimer, the term of this patent is extended or adjusted under 35 U.S.C. 154(b) by 197 days.

(21) Appl. No.: 16/267,594

(22) Filed: Feb. 5, 2019

(65) Prior Publication Data
US 2020/0250595 A1 Aug. 6, 2020

(51) Int. Cl.
*G06Q 10/00* (2012.01)
*G06Q 10/06* (2012.01)
*H04L 29/08* (2006.01)
*G06Q 10/04* (2012.01)
*G06N 20/00* (2019.01)

(52) U.S. Cl.
CPC ......... *G06Q 10/0631* (2013.01); *G06N 20/00* (2019.01); *G06Q 10/04* (2013.01); *H04L 67/1025* (2013.01)

(58) Field of Classification Search
None
See application file for complete search history.

(56) References Cited

U.S. PATENT DOCUMENTS

| 8,997,051 | B2 | 3/2015 | Robertson et al. |
| 9,424,094 | B2 | 8/2016 | Cardosa et al. |
| 9,559,920 | B1 | 1/2017 | Childress et al. |
| 9,917,754 | B2 | 3/2018 | Childress et al. |
| 9,930,111 | B2 | 3/2018 | Sharma et al. |
| 2004/0204991 | A1* | 10/2004 | Monahan ........... G06Q 30/0275 705/14.14 |

(Continued)

OTHER PUBLICATIONS

Divakar, Varun, Calculating The Covariance Matrix and Portfolio Variance, Dec. 27, 2018, QuantInsti, https://blog.quantinsti.com/calculating-covariance-matrix-portfolio-variance/, p. 1-14.*

(Continued)

*Primary Examiner* — Joseph M Waesco
(74) *Attorney, Agent, or Firm* — Michael A. Springs (57) ABSTRACT

A memory stores a log that includes first, second, and third datasets each containing server information collected at different times. The processor forms vectors from the datasets, calculates distance vectors between them and uses the distance vectors and pairwise angles between distance vectors to predict a dataset for a first future time. When the first future time arrives, the processor collects the server information, stores it in a fourth dataset, and calculates a variance between that dataset and the predicted dataset. Using the variance, distance vectors, and angles, the processor determines a second predicted dataset corresponding to a second future time, from which it determines a server usage prediction. If the server usage prediction is below a decommission threshold, the processor decommissions the server. If the server usage prediction is above a capacity threshold, the processor generates a report advising an administrator to upgrade or remove projects from the server.

17 Claims, 5 Drawing Sheets

(56) References Cited

U.S. PATENT DOCUMENTS

| | | | | |
|---|---|---|---|---|
| 2013/0097664 A1* | 4/2013 | Herz | ............ | G06Q 10/10 |
| | | | | 726/1 |
| 2014/0039965 A1* | 2/2014 | Steven | ............ | G06Q 50/06 |
| | | | | 705/7.25 |
| 2014/0215033 A1* | 7/2014 | Ravichandran | ..... | H04L 41/5048 |
| | | | | 709/221 |
| 2016/0055044 A1* | 2/2016 | Kawai | ............ | G06N 20/00 |
| | | | | 714/26 |
| 2016/0300049 A1* | 10/2016 | Guedalia | ............ | G06K 9/6272 |
| 2017/0124635 A1* | 5/2017 | Shao | ............ | G06Q 30/0641 |
| 2017/0249763 A1* | 8/2017 | Garvey | ............ | G06F 11/3452 |
| 2019/0034435 A1* | 1/2019 | Gubanov | ............ | G06F 16/3322 |
| 2019/0035123 A1* | 1/2019 | Garvey | ............ | G06F 17/18 |
| 2019/0227528 A1* | 7/2019 | Abbott | ............ | G05B 13/0265 |
| 2019/0311298 A1* | 10/2019 | Kopp | ............ | G06K 9/6256 |
| 2020/0004759 A1* | 1/2020 | Brebner | ............ | G06F 16/245 |
| 2020/0005523 A1* | 1/2020 | Brebner | ............ | H04W 4/33 |
| 2020/0074323 A1* | 3/2020 | Martin | ............ | G06F 9/5061 |

OTHER PUBLICATIONS

Ellison, Martyn, Evaluating Cloud Database Migration Options Using Workload Models, Mar. 15, 2018, Journal of Cloud Computing, https://link.springer.com/article/10.1186/s13677-018-0108-5, p. 1-18.*

* cited by examiner

SERVER TOOL

TECHNICAL FIELD

This disclosure relates generally to the allocation of projects among servers.

BACKGROUND

Organizations commonly operate large data centers to provide centralized computational services to both their customers and internal users. Each project a customer/internal user of an organization wishes to execute using the data center's resources requires access to one or more of the data center's servers, provisioned with the appropriate operating system and software for the specific project. To meet computational demands, large data centers may contain thousands of servers.

SUMMARY OF THE DISCLOSURE

Organizations commonly operate large data centers to provide centralized computational services to both their customers and internal users. Each project a customer/internal user of an organization wishes to execute using the data center's resources requires access to one or more of the data center's servers, provisioned with the appropriate operating system and software for the specific project. To meet computational demands, large data centers may contain thousands of servers. These computational demands, however, are generally not constant in time; for many organizations, demand for computation resources varies significantly according to operational time periods, seasonal variations, and other timings. Given this variation, a data center running all of its available servers wastes a significant amount of resources at times when demand for servers is low.

For small data centers with only a few servers, it may be possible for system administrators to recognize when a given server is underutilized and decommission the server (in part by moving projects off of it and consolidating these projects onto the remaining servers) to conserve computational resources. Then, when demand increases, the administrator is in a position to re-provision the decommissioned server to meet the higher demand. However, such a process is not feasible for large data centers with thousands of servers. As a result, it is a common practice among large organizations to over-provision their server systems to meet the highest levels of demand, resulting in long periods of time where individual servers are consuming power but doing no useful work, or where several servers are running at a fraction of their capacity performing tasks that could all be performed on a single server.

This disclosure contemplates an unconventional server tool that addresses one or more of the above issues. The server tool collects information about server usage and performance over time. The server tool then uses this information to predict the future usage of a server, taking into account both the general trend of the historical server usage data, as well as any patterns the tool recognizes in the data. As the servers continue to operate, the server tool continues to collect server information, which it then compares to the predictions it had previously made. The server tool uses the variance between its predictions and reality to continually update its predictions for future times. Based on its predictions, the server tool may decide to take one of several actions. If the server tool predicts that a server usage will fall below a decommission threshold, the tool begins the decommission process for that server. On the other hand, if the server tool predicts that there will be high future demand for a server, the tool alerts a system administrator to either upgrade the server or remove projects from it. In this way, the server tool reduces the waste of server resources that occurs by running underutilized servers, while at the same time helping to ensure that resources are available for future projects. Certain embodiments of the server tool are described below.

According to one embodiment, an apparatus includes a memory and a hardware processor communicatively coupled to the memory. The memory stores a server log that includes a first historical dataset, a second historical dataset, and a third historical dataset. The first historical dataset includes a set of information collected from a first server at a first time. The second historical dataset includes the set of information collected from the first server at a second time later than the first time. The third historical dataset includes the set of information collected from the server at a third time later than the second time. The processor forms a first vector from the first historical dataset, forms a second vector from the second historical dataset, and forms a third vector from the third historical dataset. The processor then calculates a first distance vector based on a distance from the first vector to the second vector, calculates a second distance vector based on a distance from the first vector to the third vector, and calculates a first angle based on a dot product between the first distance vector and the second distance vector. The processor further determines, prior to a first future time later than the third time, based at least in part on the first distance vector, the second distance vector, and the first angle, a first predicted dataset corresponding to the first future time. The processor then collects the set of server information at the first future time and stores the set of server information collected at the first future time in a fourth historical dataset. The processor then calculates a variance between the fourth historical dataset and the first predicted dataset. The processor further determines, prior to a second future time later than the first future time, based at least in part on the first distance vector, the second distance vector, the first angle, and the variance, a second predicted dataset corresponding to the second future time. The processor then determines, based on the second predicted dataset, a server usage prediction for the second future time. The processor is further able to determine that the server usage prediction is below a decommission threshold. Then, in response to determining that the server usage prediction is below the decommission threshold, the processor decommissions the first server. The processor is also further able to determine that the server usage prediction is above a capacity threshold. Then, in response to determining that the server usage prediction is above a capacity threshold, the processor generates a report advising an administrator to upgrade the first server or remove projects from the first server.

According to another embodiment, a method includes accessing a server log stored in a memory. The server log includes a first historical dataset which includes a set of information collected from a first server at a first time, a second historical dataset which includes the set of information collected from the first server at a second time later than the first time, and a third historical dataset which includes the set of information collected from the server at a third time later than the second time. The method also includes forming a first vector from the first historical dataset, forming a second vector from the second historical dataset, and forming a third vector from the third historical dataset. The method further includes calculating a first distance vector based on a distance from the first vector to the second vector, calculating a second distance vector based on a distance from the first vector to the third vector, and calculating a first angle based on a dot product between the first distance vector and the second distance vector. The method also includes determining, prior to a first future time later than the third time, based at least in part on the first distance vector, the second distance vector, and the first angle, a first predicted dataset corresponding to the first future time. The method further includes collecting the set of server information at the first future time and storing the set of server information collected at the first future time in a fourth historical dataset. The method also includes calculating a variance between the fourth historical dataset and the first predicted dataset. The method further includes determining, prior to a second future time later than the first future time, based at least in part on the first distance vector, the second distance vector, the first angle, and the variance, a second predicted dataset corresponding to the second future time. The method further includes determining, based on the second predicted dataset, a server usage prediction for the second future time. The method further includes determining that the server usage prediction is below a decommission threshold. In response to determining that the server usage prediction is below the decommission threshold, the method includes decommissioning the first server. The method further includes determining that the server usage prediction is above a capacity threshold. In response to determining that the server usage prediction is above a capacity threshold, the method includes generating a report advising an administrator to upgrade the first server or remove projects from the first server.

According to a further embodiment, a system includes a storage element and a processing element communicatively coupled to the storage element. The storage element is operable to store a first historical dataset, a second historical dataset, and a third historical dataset. The first historical dataset includes a set of information collected from a first server at a first time. The second historical dataset includes the set of information collected from the first server at a second time later than the first time. The third historical dataset includes the set of information collected from the server at a third time later than the second time. The processing element is operable to form a first vector from the first historical dataset, form a second vector from the second historical dataset, and form a third vector from the third historical dataset. The processing element is further operable to calculate a first distance vector based on a distance from the first vector to the second vector, calculate a second distance vector based on a distance from the first vector to the third vector, and calculate a first angle based on a dot product between the first distance vector and the second distance vector. The processing element is additionally operable to determine, prior to a first future time later than the third time, using machine learning based at least in part on the first distance vector, the second distance vector, and the first angle, a first predicted dataset corresponding to the first future time. The processing element is further operable to collect the set of server information at the first future time and store the set of server information collected at the first future time in a fourth historical dataset. The processing element is also operable to calculate a variance between the fourth historical dataset and the first predicted dataset. The processing element is further operable to determine, prior to a second future time later than the first future time, using machine learning based at least in part on the first distance vector, the second distance vector, the first angle, and the variance, a second predicted dataset corresponding to the second future time. The processing element is further operable to determine, based on the second predicted dataset, a server usage prediction for the second future time. The processing element is also operable to determine that the server usage prediction is below a decommission threshold. In response to determining that the server usage prediction is below the decommission threshold, the processing element is operable to decommission the first server. The processing element is additionally operable to determine that the server usage prediction is above a capacity threshold. In response to determining that the server usage prediction is above a capacity threshold, the processing element is operable to generate a report advising an administrator to upgrade the first server or remove projects from the first server.

Certain embodiments provide one or more technical advantages. For example, an embodiment will reduce the cost (both financially and environmentally) of operating a data center by decommissioning servers that are underutilized, thereby reducing the amount of power consumed by the data center. As another example, an embodiment will extend the useful life of an organization's servers. Operating a server (including its power supply, cooling fans, and circuitry) at times when the server is underutilized—as opposed to decommissioning and turning off the server—will necessarily shorten the server's life. As a further example, an embodiment increases the likelihood a data center will be able to meet demand for its server resources. If a new project requires vastly different software from that required by projects running on underutilized servers, it may not be possible to install the required software and run the new project on those servers, even though the servers, in theory, are capable of providing the required computational resources. By decommissioning underutilized servers, the data center frees these servers up to be provisioned in the specific manner necessary for a new project. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

Organizations commonly operate large data centers to provide centralized computational services to both their customers and internal users. Each project a customer/internal user of an organization wishes to execute using the data center's resources requires access to one or more of the data center's servers, provisioned with the appropriate operating system and software for the specific project. To meet computational demands, large data centers may contain thousands of servers. These computational demands, however, are generally not constant in time; for many organizations, demand for computation resources varies significantly according to operational time periods, seasonal variations, and other timings. Given this variation, a data center running all of its available servers wastes a significant amount of resources at times when demand for servers is low.

For small data centers with only a few servers, it may be possible for system administrators to recognize when a given server is underutilized and decommission the server (in part by moving projects off of it and consolidating these projects onto the remaining servers) to conserve computational resources. Then, when demand increases, the administrator is in a position to re-provision the decommissioned server to meet the higher demand. However, such a process is not feasible for large data centers with thousands of servers. As a result, it is a common practice among large organizations to over-provision their server systems to meet the highest levels of demand, resulting in long periods of time where individual servers are consuming power but doing no useful work, or where several servers are running at a fraction of their capacity performing tasks that could all be performed on a single server.

This disclosure contemplates an unconventional server tool that addresses one or more of the above issues. The server tool collects information about server usage and performance over time. The server tool then uses this information to predict the future usage of a server, taking into account both the general trend of the historical server usage data, as well as any patterns the tool recognizes in the data. As the servers continue to operate, the server tool continues to collect server information, which it then compares to the predictions it had previously made. The server tool uses the variance between its predictions and reality to continually update its predictions for future times. Based on its predictions, the server tool may decide to take one of several actions. If the server tool predicts that a server usage will fall below a decommission threshold, the tool begins the decommission process for that server. On the other hand, if the server tool predicts that there will be high future demand for a server, the tool alerts a system administrator to either upgrade the server or remove projects from it. In this way, the server tool reduces the waste of server resources that occurs by running underutilized servers, while at the same time helping to ensure that resources are available for future projects. The server tool will be described in more detail using FIGS. 1 through 5.

Figure 1:
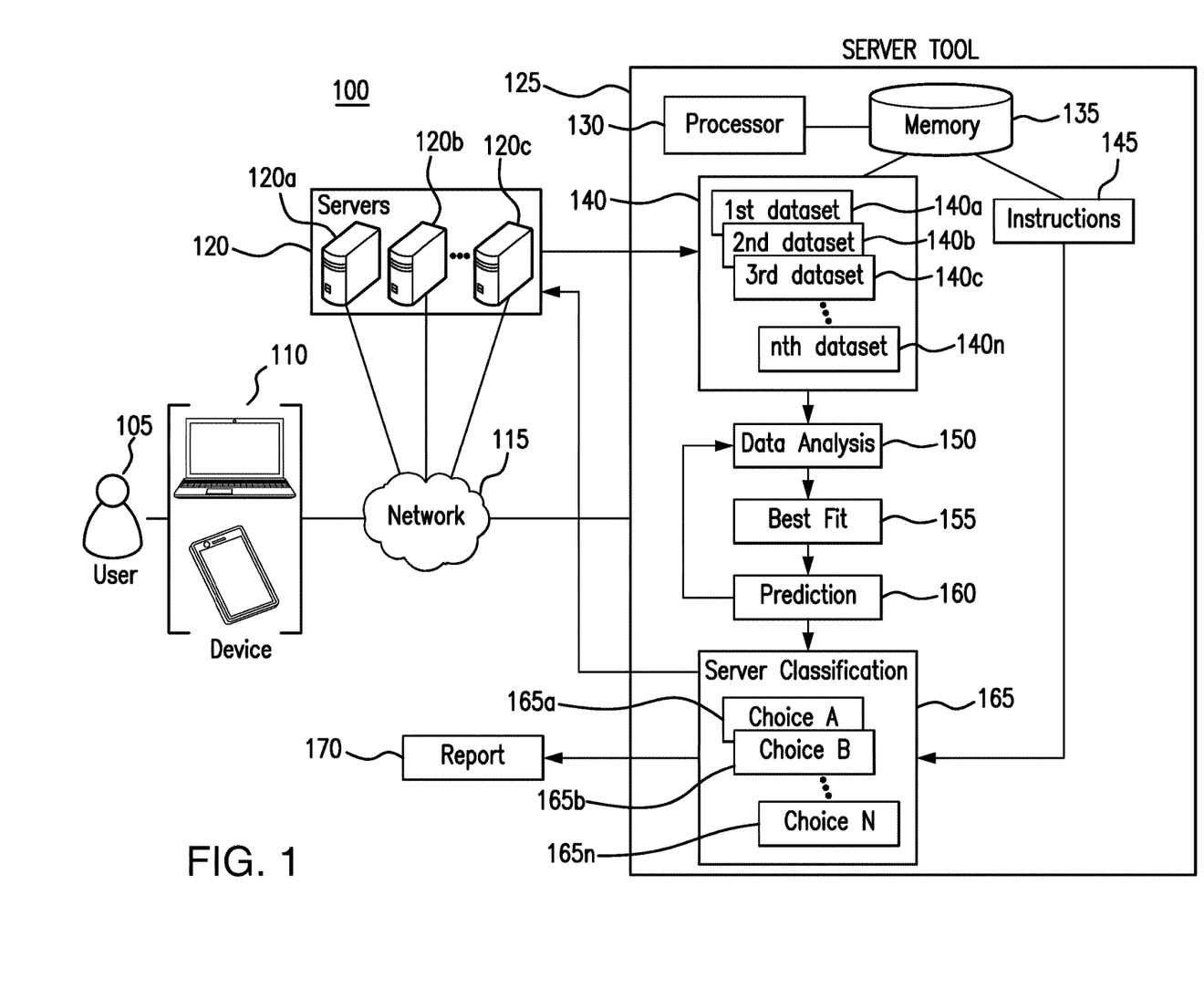
FIG. 1 illustrates an example system.

FIG. 1 illustrates an example system 100. As seen in FIG. 1, system 100 includes one or more devices 110, a network 115, one or more servers 120, and server tool 125. Generally, server tool 125 operates to predict future usage levels of servers 120. If server tool 125 predicts that a server 120 is moving towards a usage level below a decommission threshold, server tool 125 will decommission server 120. On the other hand, if server tool 125 predicts that a server 120 is moving towards a usage level above a capacity threshold, server tool 125 will send a report 170 to a system administrator recommending that the administrator either upgrade server 120 or move projects off of server 120. In this manner, server tool 125 acts to prevent the waste that occurs from operating underutilized servers, while at the same time ensuring that server resources are available when needed by future projects.

Devices 110 are used by users 105 of servers 120, including system administrators, customers of an organization, and the organization's internal users. For example, both customers and internal users 105 can use devices 110 to communicate projects to servers 120 for servers 120 to execute. System administrators 105 can use devices 110 to manage servers 120, including installing required software on servers 120, updating the software, and manually migrating projects between servers 120. Additionally, system administrators 105 can use devices 110 to receive reports 170 generated by server tool 125 advising the system administrators 105 to upgrade servers 120 or move projects off of servers 120.

Devices 110 include any appropriate device for communicating with components of system 100 over network 115. For example, devices 110 may be a telephone, a mobile phone, a computer, a laptop, a tablet, an automated assistant, and/or a cash register. This disclosure contemplates device 110 being any appropriate device for sending and receiving communications over network 115. As an example, and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. For example, when a project executes on more than one server 120, communication between those servers used occurs over network 115. Similarly, network 115 is used to send requests from devices 110 to servers 120. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Servers 120 are used to run projects and process requests submitted by users 105. Servers 120 may include application servers, database servers, file servers, mail servers, print servers, web servers, or any other type of server that provides computational functionality to users 105. A project submitted to servers 120 may use one or more servers 120 when executing. When a project uses more than one server 120, communication between those servers used by the project occurs over network 115. The computational capacity of a given server 120 depends both on its hardware and software specifications.

Server tool 125 predicts future usage levels for servers 120. Server tool 125 uses these predictions to determine whether to decommission a server 120a (if it predicts that server 120a will be underutilized in the future) or to send a report 170 to a system administrator 105 advising the system administrator 105 to either move projects off of server 120b or upgrade server 120b (if it predicts that server 120b will be overutilized in the future). In certain embodiments, server tool 125 further uses its predictions to determine whether to move a project from a first server 120a to a second server 120b, thereby freeing up server 120a to run additional projects or to be decommissioned.

Server tool 125 predicts the future server usage levels based on historical server information collected from servers 120 and stored in server log 140 as historical datasets 140a through 140n. In certain embodiments, this information may include peak-usage information, user login information, and/or processor usage for each server 120. The process by which server tool 125 predicts future server usage levels is as follows. First, server tool 125 performs data analysis 150 on historical datasets 140a through 140n, to determine a best fit model 155. Data analysis 150 involves determining both the distances and angles between historical datasets 140a through 140n and is described in greater detail below, in the discussion of FIG. 2. Using best fit model 155, server tool 125 then makes prediction 160, in which it determines predicted server usage levels for future times. To increase the accuracy of prediction 160, server tool 125 continually updates best fit model 155 by performing additional data analysis 150 each time new server information is stored in server log 140; for a new server dataset collected at time t* and stored in server log 140, server tool 125 determines the variance between its prior prediction for time t* and the actual server information collected at time t*. Data analysis 150 then uses this variance to update best fit model 155. For example, if the actual server usage levels for a server 120a are consistently higher than the predictions 160 made by server tool 125, the variances between the predictions and reality will be non-zero, and server tool 125 will use this information to adjust best fit model 155 upwards, to take into account the higher, actual server usage values.

Server tool 125 uses its server usage predictions 160 to determine whether any action needs to be taken with regards servers 120. In certain embodiments, such action may include decommissioning certain servers, requesting upgrades to certain servers, moving projects off of servers and/or re-provisioning dormant servers. In further embodiments, such action may also include moving a project from a first server 120a to a second server 120b, including installing any software that may be needed to run the project on server 120b. To determine whether to take any action, server tool 125 executes server classification process 165, which determines whether server usage predictions 160 are associated with any server classification choices 165a through 165n. Each server classification choice 165a through 165n corresponds to a specific server usage value/range of values and defines the set of actions server tool 125 should take if server usage prediction 160 falls within the specified server usage value/range of values. For example, a prediction 160 indicating that a server 120a will experience declining future usage, with usage falling below a decommission threshold, may be associated with a server classification choice 165a instructing server tool 125 to begin the process of decommissioning server 120a. On the other hand, a prediction 160 indicating that a server 120b will experience increasing future usage, with usage rising above a capacity threshold, may be associated with a server classification choice 165b instructing server tool 125 to generate a report 170 to send to a system administrator 105 advising the administrator to either upgrade server 120b or remove projects from it.

In certain embodiments, the values for the decommission threshold and the capacity threshold are set by a system administrator 105. This flexibility may be desirable if, for example, the system administrator 105 has information suggesting that server tool 125 will likely under or overestimate its server usage predictions at some future time. For instance, system administrator 105 may wish to decrease the capacity threshold if he/she has knowledge that an unexpectedly large number of projects will be submitted to servers 120 in the near future.

In certain embodiments, a set of information/instructions 145 used by server classification process 165 is stored in memory 135. The set of information/instructions 145 may include information used by server classification process 165 to determine that a project should be moved from a first server 120a to a second server 120b. For example, the set of information/instructions 145 may include a usage level below which a project running on first server 120a should be moved off of first server 120a, along with a list of second servers 120b that the project could be moved onto—either because they already contain the necessary software to run the project, or because they could support the necessary software. In the latter case, in certain embodiments, the set of information/instructions 145 may also include a list of necessary software that server tool 125 must install on server 120b before moving the project from server 120a onto server 120b.

As seen in FIG. 1, server tool 125 includes a processor 130 and a memory 135. This disclosure contemplates processor 130 and memory 135 being configured to perform any of the functions of server tool 125 described herein. Generally, server tool 125 stores historical server information in server log 140, performs data analysis 150 on this server information to determine best fit model 155, and uses best fit model 155 to make prediction 160 of future server usage information. Additionally, server tool 125 compares its predictions 160 to a set of predetermined server classifications 165, to determine whether it needs to take any action, such as decommissioning an underutilized server 120, or sending a report 170 to a system administrator 105.

Processor 130 is any electronic circuitry, including, but not limited to microprocessors, application specific integrated circuits (ASIC), application specific instruction set processor (ASIP), and/or state machines, that communicatively couples to memory 140 and controls the operation of database tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of server tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Memory 135 also stores a server log 140 containing historical server information stored as datasets 140a through 140n. In certain embodiments, this information may include peak-usage information, user login information, and/or processor usage for each server 120. Additionally, in certain embodiments, memory 135 contains a set of information/instructions 145 used in server classification process 165. In certain embodiments, the set of information/instructions 145 may include both the decommission threshold value and the capacity threshold value. In further embodiments, the set of information/instructions 145 may also include information used by server tool 125 to determine that a project should be moved from a first server 120a to a second server 120b. For example, the set of information/instructions 145 may include a usage level below which a project running on first server 120a should be moved off of first server 120a, along with a list of second servers 120b that the project could be moved onto—either because they already contain the necessary software to run the project, or because they could support the necessary software. In the latter case, the set of information/instructions 145 may also include a list of necessary software that server tool 125 must install on server 120b before moving the project from server 120a onto server 120b.

In certain embodiments, system 100 reduces the waste of valuable server resources that may otherwise occur in a large data center running all available servers 120 at times when demand for servers 120 is low. Instead of over-provisioning servers 120 to ensure the data center is able to meet peak demand, server tool 125 uses predictions of future server demand to decommission servers that are not needed in the near future. Then, when server tool 125 predicts that demand for a server is increasing, it can generate a report advising a system administrator either to upgrade the server or remove projects from the server—for example, by re-provisioning a dormant server and moving the projects onto the re-provisioned server. In further embodiments, server tool 125 is also able to use predictions of future server demand to consolidate projects running on multiple servers onto a single server, thereby freeing up certain servers either to run additional projects, or to be decommissioned.

Figure 2:
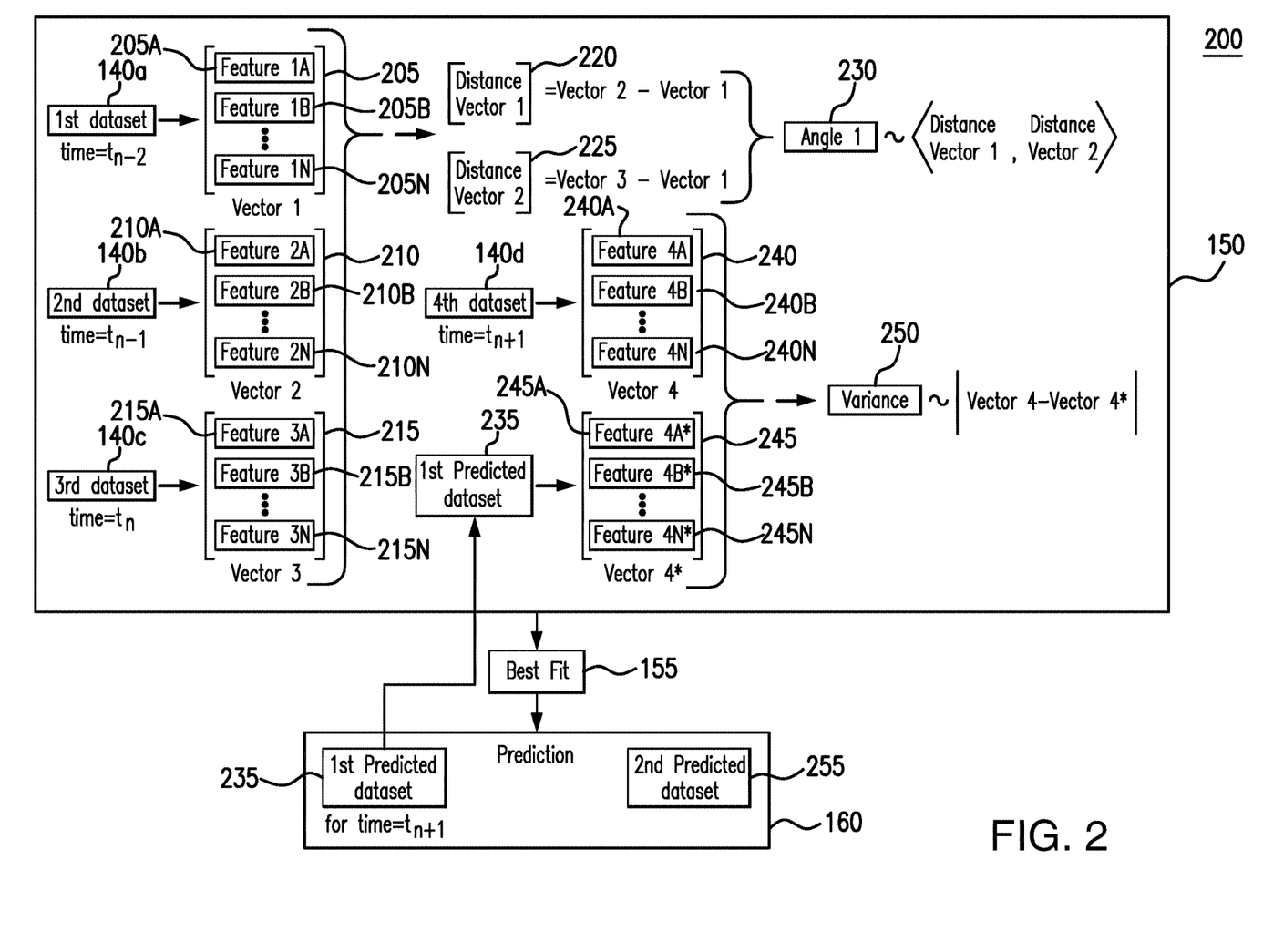
FIG. 2 illustrates the type of data used by the data analysis component of the server tool in the system of FIG. 1.

FIG. 2 illustrates the type of server data used by the data analysis process 150 of server tool 125. For simplicity, this example considers only three datasets 140a, 140b, and 140c collected from a single server. First dataset 140a contains information collected from a server 120a at time $t_{n-2}$, second dataset 140b contains information collected from server 120a at time $t_{n-1}$, and third dataset 140c contains information collected from server 120a at time $t_n$, where time $t_{n-2}$ is earlier than time $t_{n-1}$, and time $t_{n-1}$ is earlier than time $t_n$. Server tool 125 splits each dataset 140a, 140b, and 140c into a set of features, and forms a set of vectors using these features. Here, server tool 125 splits first dataset 140a into features 205A through 205N and forms first vector 205 out of these features, splits second dataset 140b into features 210A through 210N and forms second vector 210 out of these features, and splits third dataset 140c into features 215A through 215N and forms third vector 215 out of these features. In certain embodiments, the set of features includes at least one of peak usage information, user login information, and processor usage.

In certain embodiments, server tool 125 normalizes the features 205A through 205N, 210A through 210N, and 215A through 215N for each of vectors 205, 210, and 215. Normalizing helps to ensure that one feature is not dominant in the resulting best fit calculation. For example, if the first feature 205A, 210A, and 215A has a significantly broader range of potential values than the other features, both the distances between vectors and the angles between distance vectors will largely be governed by this first feature. Since, as discussed in greater detail below, both the distances between vectors and the angles between distance vectors are used by server tool 125 to calculate a best fit model, if normalization is not performed, the first feature will dominate the result. This disclosure contemplates that several different methods of normalization are possible. For example, feature standardization may be used, in which the values of each feature in the vectors are adjusted such that each feature has a zero mean and unit-variance. As another example, the features in each vector may be scaled such that the resulting vector is of length one.

In further embodiments, different weights may be attached to the normalized features. This may be desirable if the features do not all have the same predictive value; if certain features are of greater predictive value they may be assigned larger weights and will therefore be given greater importance in the subsequent calculations.

Once server tool 125 has formed vectors 205, 210, and 215, server tool 125 next determines the distances between pairs of vectors, and stores these as distance vectors 220 and 225. Here, first distance vector 220 corresponds to the distance from first vector 205 to second vector 210, and second distance vector 225 corresponds to the distance from first vector 205 to third vector 215. Additionally, server tool 125 calculates the angles between pairs of distance vectors, using the dot product of pairs of distance vectors. Here, first angle 230 is calculated using the dot product of first distance vector 220 and second distance vector 225. For simplicity, this example considers only distance vectors 220 and 225, and angle 230 between these two distance vectors. However, in practice, server tool 125 may calculate as many distance vectors as there exist pairwise combinations of vectors 205, 210, and 215, and as many angles as there exist pairwise combinations of distance vectors.

Server tool 125 uses distance vectors 220 and 225 along with angle 230 to determine a best fit model 155 for datasets 140a, 140b, and 140c. Server tool 125 then uses best fit model 155 to make prediction 160, where server tool 125 determines first predicted dataset 235 corresponding to future time $t_{n+1}$. In determining best fit model 155, server tool 125 uses the distance vectors to determine the general trend in the data, while server tool 125 uses the angles between distance vectors to help identify any patterns in the data, as described in further detail below in the discussion of FIG. 4.

In certain embodiments, server tool 125 uses a machine learning model to determine best fit model 155 and make prediction 160. For example, server tool 125 may assign adjustable weights to features 205A through 205N, 210A through 210N, and 215A through 215N of vectors 205, 210, and 215, and use machine learning to determine an optimal weight for each feature. In further embodiments, in performing the machine learning analysis, server tool 125 splits the collection of historical server datasets—illustrated here with only three datasets 140a, 140b, and 140c, but in practice including a large number of additional datasets—into a training dataset, used to train the machine learning model, and a testing dataset, used to test the machine learning model and determine its accuracy level.

At time $t_{n+1}$, server tool 125 collects information from server 120 and stores this information as a fourth dataset 140d. To increase the accuracy of best fit model 155, server tool 125 compares its first predicted dataset 235 (corresponding to time $t_{n+1}$), with this actual server information collected at time $t_{n+1}$ and stored in fourth dataset 140d. To make this comparison, server tool 125 splits first predicted dataset 235 into a set of features 245A through 245N and forms predicted fourth vector 245 from these features. Similarly, server tool 125 splits fourth dataset 140d into a set of features 240A through 240N, and forms fourth vector 240 from these features. Server tool 125 then computes the variance 250 between fourth vector 240 and predicted fourth vector 245.

Using variance 250, along with distance vectors 220 and 225 and angle 230 server tool 125 next computes an updated best fit model 155. Server tool 125 then uses updated best fit model 155 to make prediction 160, where server tool 125 determines second predicted dataset 255. Again, for simplicity, this example considers only distance vectors 220 and 225, and angle 230 between these two distance vectors. However, in practice, server tool 125 may calculate and use as many distance vectors as there exist pairwise combinations of vectors 205, 210, 215, and 240, and as many angles as there exist pairwise combinations of distance vectors.

Figure 3:
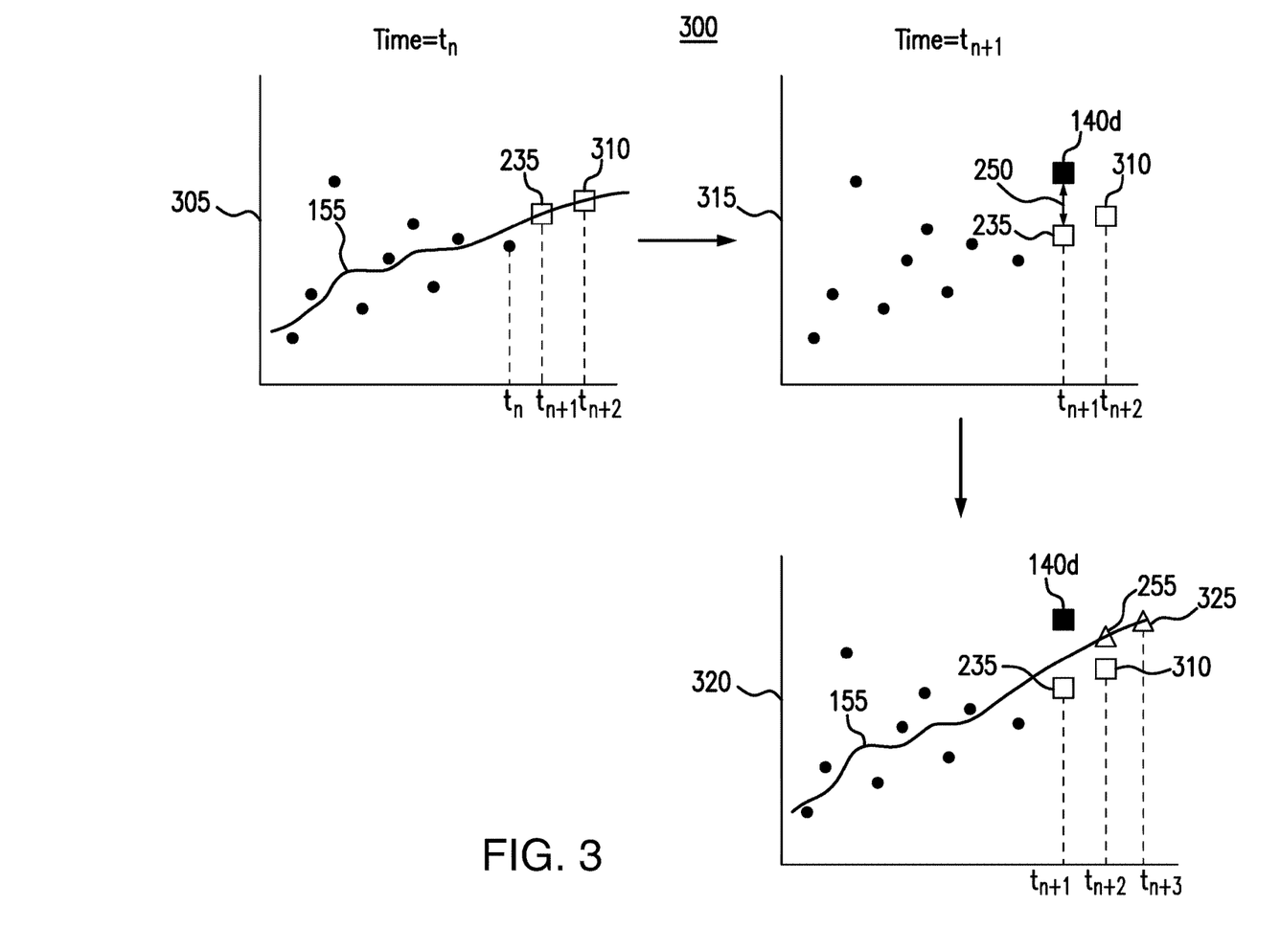
FIG. 3 provides a graphical representation of the processes of determining a best fit model for the historical server information and predicting future server information carried out by the server tool in the system of FIG. 1.

FIG. 3 presents a graphical illustration of the process by which variance 250 between a predicted dataset 235, corresponding to time $t_{n+1}$, and an actual dataset 140d measured at time $t_{n+1}$ is used to update a best fit model 155 and determine updated predictions 255 and 325. Graph 305 presents a collection of datasets—illustrated using filled circles—collected by server tool 125 for times up to and including time $t_n$. Server tool 125 determines best fit model 155 for these datasets, from which it predicts future datasets 235 and 310. As seen in graph 315, at time $t_{n+1}$, server tool collects new information from server 120a and stores this information as a new dataset 140d. Server tool 125 then calculates variance 250 between actual dataset 140d and predicted dataset 235. Server tool 125 uses variance 250 to determine updated best fit model 155, illustrated in graph 320. Updated best fit model 155 is then used to make updated predictions 255 and 325. In this manner, certain embodiments of server tool 125 are able to improve the accuracy of the predicted server information.

Figure 4:
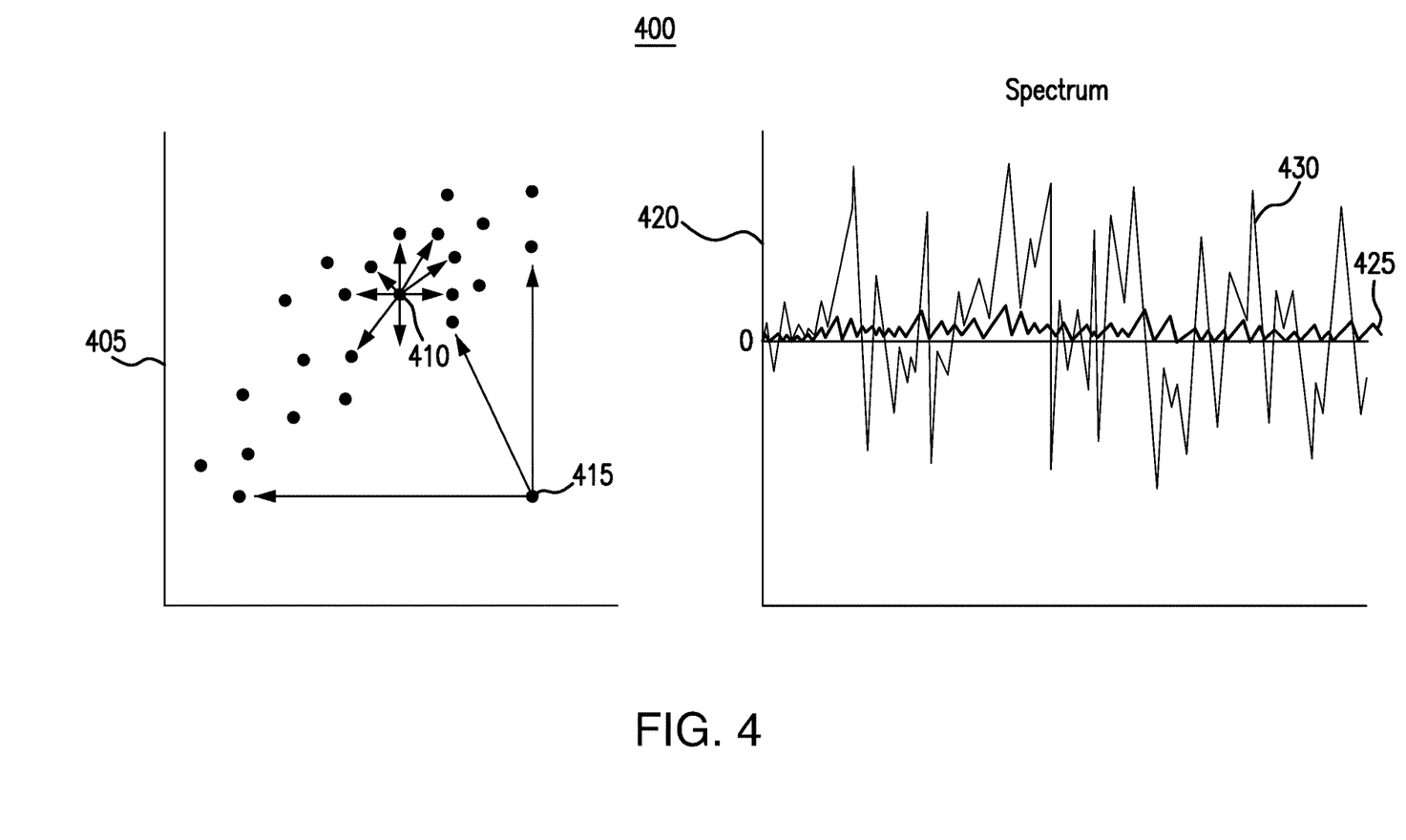
FIG. 4 illustrates the difference between the spectrum of angles for a dataset in the interior of the distribution of datasets and an outlier dataset.

FIG. 4 illustrates the information that can be gained by measuring the pairwise angles between distance vectors. Graph 405 presents a collection of datasets, illustrated as filled circles. As can be seen, dataset 410 corresponds to an internal point in the distribution of datasets, while dataset 415 corresponds to an outlier point. For both internal point 410 and outlier point 415, server tool 125 determines pairwise angles between distance vectors formed using the given point and all of the other datasets. The resulting spectrums of angles are presented in graph 420. As can be seen, spectrum 430—corresponding to internal point 410—is broad, while spectrum 425—corresponding to outlier 415—is narrow. This is because internal point 410 has other datasets all around it, resulting in a broad range of different angles. On the other hand, the range of angles for pairs of datasets around dataset 415 is smaller, as most pairs of other datasets are clustered towards the upper left of Graph 405, as compared to dataset 415. Therefore, by measuring the pairwise angles between distance vectors, server tool 125 is able to determine those datasets 415 that have small spectrums and therefore correspond to outliers. This method of outlier detection is useful, as it is better at avoiding the "curse of dimensionality" for datasets containing a large number of features (i.e. vectors 205, 210, and 215 of large dimension) than outlier detection methods that simply rely on the distance vectors between datasets.

Determining which datasets correspond to outliers is important to help ensure the accuracy of the predicted server information. For example, consider a server 120a that generally experiences low usage levels, with the exception that on the first Monday of each month the usage exhibits a significant spike. A method that considers only the general trend of the data will likely average out these usage spikes such that for all times except the first Monday of each month the predicted usage levels will be slightly higher than reality, while for the first Monday of each month, the predicted usage levels will be significantly lower than reality. However, by determining that the usage levels measured on the first Monday of each month are outliers, server tool 125 can recognize that the data exhibits a repeating pattern of high usage on the first Monday of each month and reproduce this pattern in its predictions.

Figure 5:
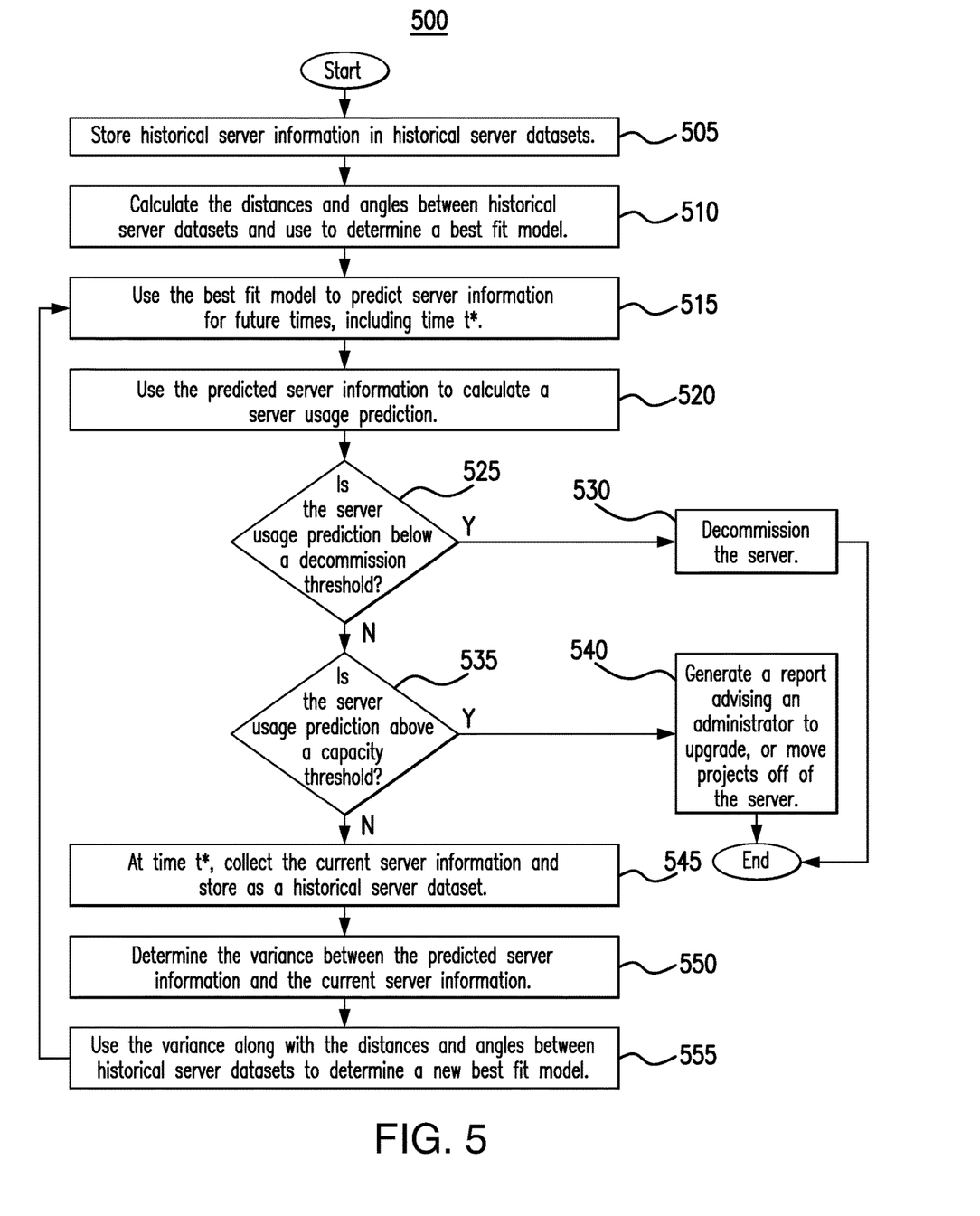
FIG. 5 presents a flowchart illustrating the process by which the server tool in the system of FIG. 1 predicts future server usage and takes action based on such predictions.

FIG. 5 further illustrates the process by which server tool 125 predicts future server usage levels and takes action based on such predictions. In step 505, server tool 125 collects historical server information and stores it as historical server datasets 140a through 140n, in server log 140. In certain embodiments, this information may include peak-usage information, user login information, and/or processor usage for server 120a. In step 510, server tool 125 performs data analysis 150 on the historical server datasets 140a through 140n to determine a best fit model 155 for these datasets. Data analysis 150 consists of splitting the historical server datasets 140a through 140n into a set of features, forming vectors from these features, calculating the distance vectors between pairs of vectors, and calculating the angles between pairs of distance vectors, as described in greater detail above, in the discussion of FIG. 2.

In certain embodiments, server tool 125 normalizes the features used to compose the vectors. Normalizing helps to ensure that one feature is not dominant in the resulting best fit calculation. For example, if the first feature has a significantly broader range of potential values than the other features, both the distances between vectors and the angles between distance vectors will largely be governed by this first feature. Since both the distances between vectors and the angles between distance vectors are used by server tool 125 to calculate a best fit model 155, if normalization is not performed, the first feature will dominate the result. This disclosure contemplates that several different methods of normalization are possible. For example, feature standardization may be used, in which the values of each feature in the vectors are adjusted such that each feature has a zero mean and unit-variance. As another example, the features in each vector may be scaled such that the resulting vector is of length one.

In further embodiments, different weights may be attached to the normalized features. This may be desirable if the features do not all have the same predictive value; if certain features are of greater predictive value they may be assigned larger weights and will therefore be given greater importance in the subsequent calculations.

In certain embodiments, server tool 125 uses a machine learning model to determine best fit model 155. For example, server tool 125 may assign adjustable weights to the features and use machine learning to determine an optimal weight for each feature. In further embodiments, in performing the machine learning analysis, server tool 125 splits the collection of historical server datasets into a training dataset, used to train the machine learning model, and a testing dataset, used to test the machine learning model and determine its accuracy level.

In step 515, server tool 125 uses best fit model 155 to predict server information for future times, including time t*. Then, in step 520, server tool 125 uses its predictions to calculate future server usage predictions. At step 525, server tool 125 determines whether future server usage predictions are below a decommission threshold. If server tool 125 determines that the future server usage predictions are below a decommission threshold, in step 530 server tool 125 begins the decommission process. If server tool 125 determines that the future server usage predictions are not below a decommission threshold, server tool 125 next determines whether future server usage predictions are above a capacity threshold, at step 535. If server tool 125 determines that the future server usage predictions are above a capacity threshold, then in step 540 server tool 125 generates a report advising an administrator 105 to upgrade the server 120a or move projects off of it.

In certain embodiments, the values for the decommission threshold and the capacity threshold are set by a system administrator 105. This flexibility may be desirable if, for example, the system administrator 105 has information suggesting that server tool 125 will likely under or overestimate its server usage predictions at some future time. For instance, system administrator 105 may wish to decrease the capacity threshold if he/she has knowledge that an unexpectedly large number of projects will be submitted to server 120 in the near future.

If server tool 125 determines that the future server usage predictions are not above a capacity threshold, server tool 125 continues to collect server information, including server information at time t*, which it stores as additional historical server datasets at step 545. At step 550, server tool 125 determines the variance between the server information it previously predicted for time t* and the actual server information collected at time t*. Next, at step 555, server tool 125 performs data analysis 150 to update the collection of distance vectors and angles previously calculated, using the newly collected historical server datasets. It then uses the distance vectors and angles, along with the variance to determine a new best fit model 155. Server tool 125 then returns to step 515 to continue predicting future server usage levels, repeating the process until it either decommissions the server at step 530, or generates a report advising a system administrator 105 to upgrade or move projects off of the server 120a at step 540.

Method 500 illustrates the process for a single server 120a. In certain embodiments, in addition to step 525 and 535, server tool 125 also uses a set of information/instructions 145 stored in memory 135 to determine whether to take additional action when system 100 contains multiple servers 120. In certain embodiments, the set of information/instructions 145 may include information used by server tool 125 to determine that a project should be moved from a first server 120a to a second server 120b. For example, the set of information/instructions 145 may include a usage level below which a project running on first server 120a should be moved off of first server 120a, along with a list of second servers 120b that the project could be moved onto—either because they already contain the necessary software to run the project, or because they could support the necessary software. In the latter case, the set of information/instructions 145 may also include a list of necessary software that server tool 125 must install on server 120b before moving the project from server 120a onto server 120b.

Modifications, additions, or omissions may be made to method 500 depicted in FIG. 5. Method 500 may include more, fewer, or other steps. For example, steps may be performed in parallel or in any suitable order. While discussed as server tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory configured to store a set of instructions and a server log comprising:
a first historical dataset comprising a set of information collected from a first server at a first time;
a second historical dataset comprising the set of information collected from the first server at a second time later than the first time; and
a third historical dataset comprising the set of information collected from the server at a third time later than the second time; and
a hardware processor communicatively coupled to the memory, the hardware processor configured to:
form a first vector from the first historical dataset;
form a second vector from the second historical dataset;
form a third vector from the third historical dataset;
calculate a first distance vector based on a distance from the first vector to the second vector;
calculate a second distance vector based on a distance from the first vector to the third vector;
calculate a first angle based on a dot product between the first distance vector and the second distance vector;
determine, prior to a first future time later than the third time, based at least in part on the first distance vector, the second distance vector, and the first angle, a first predicted dataset corresponding to the first future time;
collect the set of server information at the first future time and store the set of server information collected at the first future time in a fourth historical dataset;
calculate a variance between the fourth historical dataset and the first predicted dataset;
determine, prior to a second future time later than the first future time, based at least in part on the first distance vector, the second distance vector, the first angle, and the variance, a second predicted dataset corresponding to the second future time;
determine, based on the second predicted dataset, a server usage prediction for the second future time;
determine, based on the set of instructions and the server usage prediction, that a project should be moved from the first server to a second server;
move the project from the first server to the second server;
determine that the server usage prediction is below a decommission threshold;
in response to determining that the server usage prediction is below the decommission threshold, decommission the first server;
determine that the server usage prediction is above a capacity threshold; and
in response to determining that the server usage prediction is above a capacity threshold, generate a report advising an administrator to upgrade the first server or remove projects from the first server.

2. The apparatus of claim 1, wherein determining the first predicted dataset and the second predicted dataset comprises using a machine learning model.

3. The apparatus of claim 1, wherein the set of instructions includes a list of software that is not installed on the second server and is needed to run the project; and
the processor is further configured to install the list of software on the second server.

4. The apparatus of claim 1, wherein the set of information comprises at least one of peak-usage information, user login information, and processor usage.

5. The apparatus of claim 1, wherein the first vector, the second vector, and the third vector are normalized.

6. The apparatus of claim 1, wherein the decommission threshold and the capacity threshold are set by the administrator.

7. A method comprising:
accessing a server log stored in a memory, the server log comprising:
  a first historical dataset comprising a set of information collected from a first server at a first time;
  a second historical dataset comprising the set of information collected from the first server at a second time later than the first time; and
  a third historical dataset comprising the set of information collected from the server at a third time later than the second time;
forming a first vector from the first historical dataset;
forming a second vector from the second historical dataset;
forming a third vector from the third historical dataset;
calculating a first distance vector based on a distance from the first vector to the second vector;
calculating a second distance vector based on a distance from the first vector to the third vector;
calculating a first angle based on a dot product between the first distance vector and the second distance vector;
determining, prior to a first future time later than the third time, based at least in part on the first distance vector, the second distance vector, and the first angle, a first predicted dataset corresponding to the first future time;
collecting the set of server information at the first future time and storing the set of server information collected at the first future time in a fourth historical dataset;
calculating a variance between the fourth historical dataset and the first predicted dataset;
determining, prior to a second future time later than the first future time, based at least in part on the first distance vector, the second distance vector, the first angle, and the variance, a second predicted dataset corresponding to the second future time;
determining, based on the second predicted dataset, a server usage prediction for the second future time;
accessing a set of instructions stored in the memory;
determining, based on the set of instructions and the server usage prediction, that a project should be moved from the first server to a second server;
moving the project from the first server to the second server;
determining that the server usage prediction is below a decommission threshold;
in response to determining that the server usage prediction is below the decommission threshold, decommissioning the first server;
determining that the server usage prediction is above a capacity threshold; and
in response to determining that the server usage prediction is above a capacity threshold, generating a report advising an administrator to upgrade the first server or remove projects from the first server.

8. The method of claim 7, wherein determining the first predicted dataset and the second predicted dataset comprises using a machine learning model.

9. The method of claim 7, further comprising:
installing a list of software on the second server, wherein the list of software is stored in the set of instructions and comprises software that is not installed on the second server and that is needed to run the project.

10. The method of claim 7, wherein the set of information comprises at least one of peak-usage information, user login information, and processor usage.

11. The method of claim 7, wherein the first vector, the second vector, and the third vector are normalized.

12. The method of claim 7, wherein the decommission threshold and the capacity threshold are set by the administrator.

13. A system comprising:
a storage element operable to store:
  a set of instructions;
  a first historical dataset comprising a set of information collected from a first server at a first time;
  a second historical dataset comprising the set of information collected from the first server at a second time later than the first time; and
  a third historical dataset comprising the set of information collected from the server at a third time later than the second time; and
a processing element communicatively coupled to the storage element and operable to:
  form a first vector from the first historical dataset;
  form a second vector from the second historical dataset;
  form a third vector from the third historical dataset;
  calculate a first distance vector based on a distance from the first vector to the second vector;
  calculate a second distance vector based on a distance from the first vector to the third vector;
  calculate a first angle based on a dot product between the first distance vector and the second distance vector;
  determine, prior to a first future time later than the third time, using machine learning based at least in part on the first distance vector, the second distance vector, and the first angle, a first predicted dataset corresponding to the first future time;
collect the set of server information at the first future time and store the set of server information collected at the first future time in a fourth historical dataset;
calculate a variance between the fourth historical dataset and the first predicted dataset;
determine, prior to a second future time later than the first future time, using machine learning based at least in part on the first distance vector, the second distance vector, the first angle, and the variance, a second predicted dataset corresponding to the second future time;
determine, based on the second predicted dataset, a server usage prediction for the second future time;
determine, based on the set of instructions and the server usage prediction, that a project should be moved from the first server to a second server;
move the project from the first server to the second server;
determine that the server usage prediction is below a decommission threshold;
in response to determining that the server usage prediction is below the decommission threshold, decommission the first server;
determine that the server usage prediction is above a capacity threshold; and
in response to determining that the server usage prediction is above a capacity threshold, generate a report advising an administrator to upgrade the first server or remove projects from the first server.

14. The system of claim 13, wherein the set of instructions includes a list of software that is not installed on the second server and is needed to run the project; and
the processing element is further operable to install the list of software on the second server.

15. The system of claim 13, wherein the set of information comprises at least one of peak-usage information, user login information, and processor usage.

16. The system of claim 13, wherein the first vector, the second vector, and the third vector are normalized.

17. The system of claim 13, wherein the decommission threshold and the capacity threshold are set by the administrator.

* * * * *